(12) United States Patent
Choi et al.

(10) Patent No.: US 10,101,613 B2
(45) Date of Patent: Oct. 16, 2018

(54) LIQUID CRYSTAL DISPLAY DEVICE AND METHOD FOR MANUFACTURING THE SAME

(71) Applicant: LG Display Co., Ltd., Seoul (KR)

(72) Inventors: Wonjin Choi, Seoul (KR); Sejin Jang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/648,379

(22) Filed: Jul. 12, 2017

(65) Prior Publication Data

US 2017/0307940 A1 Oct. 26, 2017

Related U.S. Application Data

(62) Division of application No. 14/327,763, filed on Jul. 10, 2014, now Pat. No. 9,733,522.

(30) Foreign Application Priority Data

Nov. 27, 2013 (KR) .................. 10-2013-0145506

(51) Int. Cl.
| | |
|---|---|
| G02F 1/1337 | (2006.01) |
| G02F 1/1339 | (2006.01) |
| G02F 1/1333 | (2006.01) |

(52) U.S. Cl.
CPC ...... *G02F 1/133723* (2013.01); *G02F 1/1333* (2013.01); *G02F 1/1339* (2013.01);
(Continued)

(58) Field of Classification Search
CPC ............... G02F 1/13394; G02F 1/1337; G02F 1/133711
See application file for complete search history.

(56) References Cited

U.S. PATENT DOCUMENTS

| | | |
|---|---|---|
| 5,621,553 A | 4/1997 | Nishiguchi et al. |
| 5,870,162 A | 2/1999 | Fujimori et al. |
| (Continued) | | |

FOREIGN PATENT DOCUMENTS

| | | |
|---|---|---|
| CN | 1625715 A | 6/2005 |
| CN | 1982966 A | 6/2007 |
| (Continued) | | |

OTHER PUBLICATIONS

Chinese Office Action, Chinese Application No. 201410389861.3, dated Feb. 27, 2017, 7 pages. (with concise explanation of relevance).

(Continued)

*Primary Examiner* — Thanh-Nhan P Nguyen
(74) *Attorney, Agent, or Firm* — Fenwick & West LLP

(57) ABSTRACT

The present disclosure provides a liquid crystal display device and a method for manufacturing the same. The device includes: a first substrate; a second substrate spaced apart from and opposite to the first substrate; a first lower alignment layer formed on an upper surface of the first substrate; a first upper alignment layer formed on a lower surface of the second substrate; a second alignment layer formed in an array on either or both of an upper surface of the first lower alignment layer and a lower surface of the first upper alignment layer; a polymer barrier positioned between the first substrate and the second substrate, the polymer barrier formed on the array of the second alignment layer; and a liquid crystal positioned between the polymer barriers.

10 Claims, 11 Drawing Sheets

(52) U.S. Cl.
CPC .... *G02F 1/13378* (2013.01); *G02F 1/133305* (2013.01); *G02F 1/133377* (2013.01); *G02F 1/133784* (2013.01); *G02F 2202/28* (2013.01)

(56) References Cited

U.S. PATENT DOCUMENTS

| | | |
|---|---|---|
| 6,014,188 A | 1/2000 | Yamada et al. |
| 6,115,098 A | 9/2000 | Kume et al. |
| 2004/0032561 A1 | 2/2004 | Kumar et al. |
| 2006/0285061 A1 | 12/2006 | Woo et al. |
| 2008/0036960 A1 | 2/2008 | Ding et al. |
| 2017/0285413 A1* | 10/2017 | Miyachi ............ G02F 1/133788 |

FOREIGN PATENT DOCUMENTS

| | | |
|---|---|---|
| CN | 1991479 A | 7/2007 |
| CN | 102819146 A | 12/2012 |
| JP | 2006-91200 A | 4/2006 |

OTHER PUBLICATIONS

European Patent Office, Search Report and Opinion, European Patent Application No. 14181549.8, dated Mar. 19, 2015, seven pages.
United States Office Action, U.S. Appl. No. 14/327,763, dated Feb. 9, 2017, 10 pages.

* cited by examiner

LIQUID CRYSTAL DISPLAY DEVICE AND METHOD FOR MANUFACTURING THE SAME

CROSS-REFERENCE TO RELATED APPLICATION

This application is a divisional application of U.S. application Ser. No. 14/327,763, filed on Jul. 10, 2014, which claims priority from and the benefit under 35 U.S.C. § 119(a) of Korean Patent Application No. 10-2013-0145506, filed on Nov. 27, 2013, both of which are hereby incorporated by reference for all purposes as if fully set forth herein.

BACKGROUND

1. Field

The present invention relates to a liquid crystal display device and a method for manufacturing the same.

2. Description of the Prior Art

A liquid crystal display device technology, by continuous evolving, is replacing a fixed-type display market using an existing CRT (Cathode-Ray Tube), and is being expanded to a DID (Digital Information Display) or PID (Public Information Display) market by increasingly enlarging a display device for a laptop, a computer monitor, a TV, etc. Further, the liquid crystal display device technology is also keeping its position in a mobile area. Because the liquid crystal display devices use a glass substrate, these devices can be easily broken and not deformed. Therefore, the liquid crystal display devices using a glass substrate have a disadvantage in that a display size is limited, and thus it is inconvenient to carry. To overcome this disadvantage, researches on the next generation display, which is unbreakable and deformable by using a flexible substrate instead of a glass substrate, are being actively studied.

In the case of the liquid crystal display device using a liquid crystal in methods for implementing the flexible display, because a plastic-based substrate is used, a liquid crystal in a liquid state is not restricted to a pixel inside depending on the bending of the substrate, and it is necessary to maintain a cell gap to be uniform.

Further, to obtain uniform brightness and a high contrast ratio, an aligning the injected liquid crystal molecules in a certain direction is required. Currently, the most widely used method for aligning a liquid crystal is an alignment method by rubbing. This rubbing method forms regular micro grooves on the surface of an alignment layer by rubbing after applying an alignment layer material (polyimide) on a substrate.

In LCD devices, if a cell gap is not maintained in the liquid crystal display device, problems, such as increased image retention or stains on the surface of the panel, may occur.

SUMMARY

An aspect of the present disclosure is to provide a liquid crystal display device and a method for manufacturing the same, which can reduce image retention of a liquid crystal display device and firmly maintain a cell gap.

To achieve the aspect described above, the present disclosure provides a liquid crystal display device including a first substrate; a second substrate spaced apart from and opposite to the first substrate; a first lower alignment layer formed on an upper surface of the first substrate; a first upper alignment layer formed on a lower surface of the second substrate; a second alignment layer formed in an array on either or both of an upper surface of the first lower alignment layer and a lower surface of the first upper alignment layer; a polymer barrier positioned between the first substrate and the second substrate, the polymer barrier formed on the array of the second alignment layer; and a liquid crystal positioned between the polymer barriers.

In another aspect of the present disclosure, a method for manufacturing a liquid crystal display device includes a step of forming a first lower alignment layer on an upper surface of a first substrate; a step of forming a first upper alignment layer on a lower surface of a second substrate spaced apart from and opposite to the first substrate; a step of forming a second lower alignment layer on either or both of an upper surface of the first lower alignment layer or a lower surface of the first upper alignment layer, the second lower alignment layer formed in an array; a step of sealing the first substrate and the second substrate; a step of injecting a mixture, which includes a liquid crystal and one or more of monomers, between the first substrate and the second substrate; and a step of forming a polymer barrier between the second lower alignment layer and the second upper alignment layer from the injected one or more monomers, the polymer barrier formed on the array of the second alignment layer.

In another aspect of the present disclosure provides a liquid crystal display device including a first lower alignment layer; a first upper alignment layer parallel to the first alignment layer; a polymer barrier orthogonal to the first upper alignment layer and to the first lower alignment layer, the polymer barrier including a first end proximate to the first upper alignment layer and a second end proximate to the first lower alignment layer, the polymer barrier formed in an array; and a first adhesive layer formed in the array of the polymer barrier between the polymer barrier and at least one of the first lower alignment layer and first upper alignment layer.

In another aspect of the present disclosure, a method for manufacturing a liquid crystal display device includes a step of forming a first upper alignment layer on an upper surface of a first substrate; forming a first lower alignment layer on an lower surface of a second substrate spaced apart from and opposite to the first substrate; forming an adhesive layer on at least one of the first upper alignment layer and the first lower alignment layer, the adhesive layer formed in an array; injecting a mixture including a liquid crystal and one or more of monomers between the first substrate and the second substrate; and forming a polymer barrier in the array between the adhesive layer and at least one of the first lower alignment layer and the first upper alignment layer.

The present disclosure has effects by which image retention of a liquid crystal display device can be reduced and a cell gap can be firmly maintained.

BRIEF DESCRIPTION OF THE DRAWINGS

The above and other objects, features and advantages of the present disclosure will be more apparent from the following detailed description taken in conjunction with the accompanying drawings, in which.

DETAILED DESCRIPTION

Figure 1:
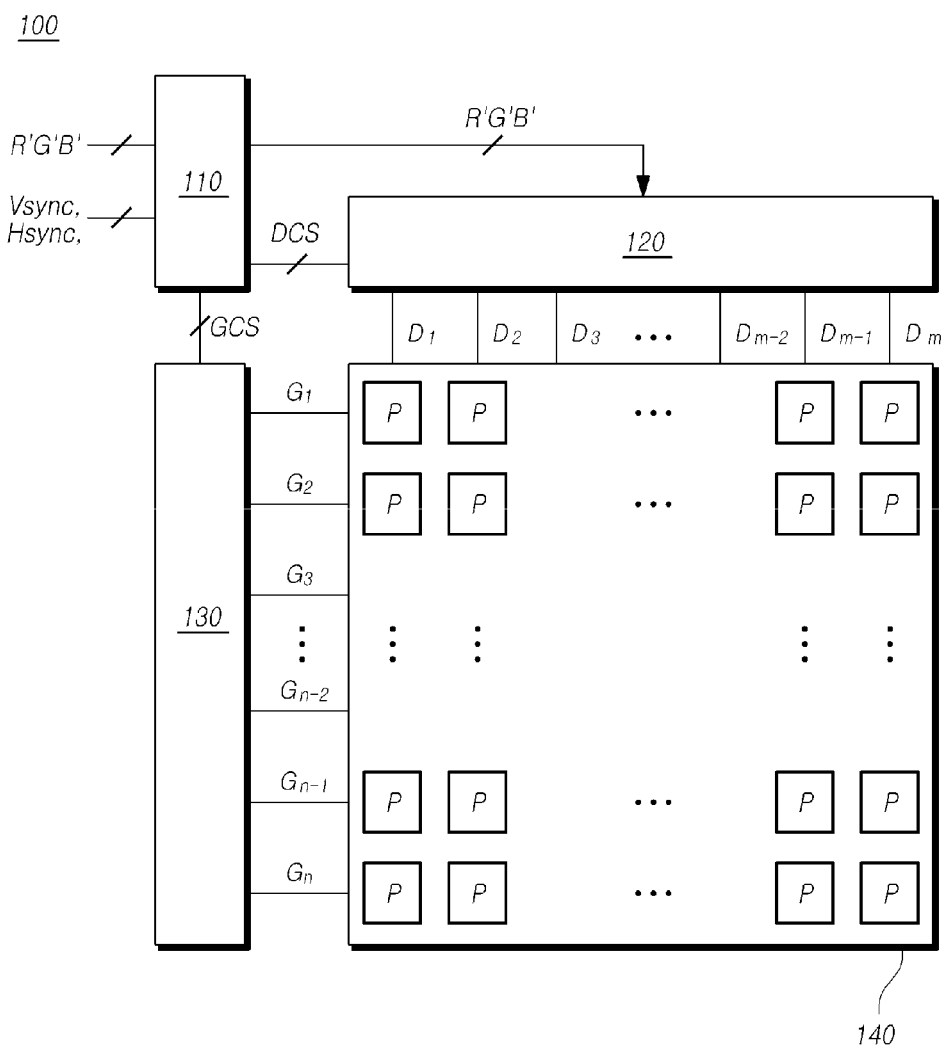
FIG. 1 is a system configuration diagram relating to a liquid crystal display device to which embodiments of the present disclosure are applied.

Hereinafter, embodiments of the present disclosure will be described with reference to the accompanying drawings. In the following description, the same elements will be designated by the same reference numerals although they are shown in different drawings. Further, in the following description of embodiments of the present disclosure, a detailed description of known functions and configurations incorporated herein will be omitted when it may make the main idea of the present disclosure unclear.

In the description of the elements of the present disclosure, terms "first", "second", "A", "B", "(a)", "(b)" and the like may be used. These terms are merely used to distinguish one element from another element, and do not limit a true nature, a sequence or an order of the corresponding element. In the case that it is described that a certain structural element "is connected to", "is coupled with", or "is in contact with" another structural element, it should be interpreted that another structural element may "be connected to", "be coupled with", or "be in contact with" other structural elements as well as that the certain structural element is directly connected to or is in direct contact with another structural element. Likewise, when it is described that a certain element is formed "on" or "under" another element, it should be understood that the certain element may be formed either directly or indirectly via a still another element on or under the another element.

FIG. 1 is a system configuration diagram relating to a liquid crystal display device to which embodiments of the present disclosure are applied.

Referring to FIG. 1, the liquid crystal display device 100 includes a liquid crystal display panel 140, a data driver 120, a gate driver 130, and a timing controller 110.

First, the timing controller 110 outputs a data control signal (DCS) for controlling a data driver 120 and a gate control signal (GCS) for controlling a gate driver 130 based on a vertical/horizontal sync signal (Vsync, Hsync) and a video signal (RGB), which are input from a host system, and an external timing signal such as a clock signal (CLK). Further, the timing controller 110 may convert the video signal (RGB) input from the host system into a format of a data signal used in the data driver 120, and supply the converted video signal (R'G'B') to the data driver 120.

In response to the data control signal (DCS) and the converted video signal (R'G'B'), which are input from the timing controller 110, the data driver 120 converts the converted video signal (R'G'B') into the data signal (an analog pixel signal or a data voltage), which is a voltage value corresponding to a gradation value, and supplies the converted data signal to a data line.

In responds to the gate control signal (GCS) input from the timing controller 110, the gate driver 130 supplies a scan signal (a gate pulse or a scan pulse, and a gate-on signal) to a gate line sequentially.

Meanwhile, the liquid crystal display panel 140 may be the liquid crystal display device including two substrates, a liquid crystal layer positioned between the two substrates, and a single alignment layer or a plurality of alignment layers.

A first substrate of the liquid crystal display panel 140 may be implemented to a COT (Color filter On TFT) structure. In this case, a black matrix and a color filter may be formed on the first substrate.

Further, the first substrate (a lower substrate) of the liquid crystal display panel 140 may include a plurality of data lines (D1 to Dm wherein m is a natural number), a plurality of gate lines (or scan lines) (G1 to Gn wherein n is a natural number) intersecting with the data lines (D1 to Dm), a plurality of transistors formed at intersections of the data lines (D1 to Dm) and the gate lines (G1 to Gn), a plurality of pixel electrodes for charging the data voltage to liquid crystal cells, and storage capacitors connected to the pixel electrodes to maintain the voltages of the liquid crystal cells.

A second substrate (an upper substrate) of the liquid crystal display panel 140 may include a black matrix and a color filter.

Meanwhile, the pixels (P) of the liquid crystal display panel 140 are formed in pixel regions defined by the data lines (D1 to Dm) and the gate lines (G1 to Gn), and placed in a matrix form. The liquid crystal cells of pixels are driven by an electric field applied depending on a voltage difference between a data voltage applied to a pixel electrode and a common voltage applied to a common electrode, thereby adjusting the transmission amount of incident light.

Such liquid crystal display panel 140 may be implemented to any of known liquid crystal modes, such as a Twisted Nematic (TN) mode, a Vertical Alignment (VA) mode, an In Plane Switching (IPS) mode, and a Fringe Field Switching (FFS) mode.

In this case, the common electrode may be formed on the second substrate in a driving mode driven by a vertical electric field such as the TN mode and the VA mode, and the first substrate with the pixel electrode in a driving mode driven by a horizontal electric field such as the IPS mode and the FFS mode.

Hereafter, embodiments relating to the liquid crystal display device 100 including the liquid crystal display panel 140 described in FIG. 1 will be described in detail.

Figure 2:
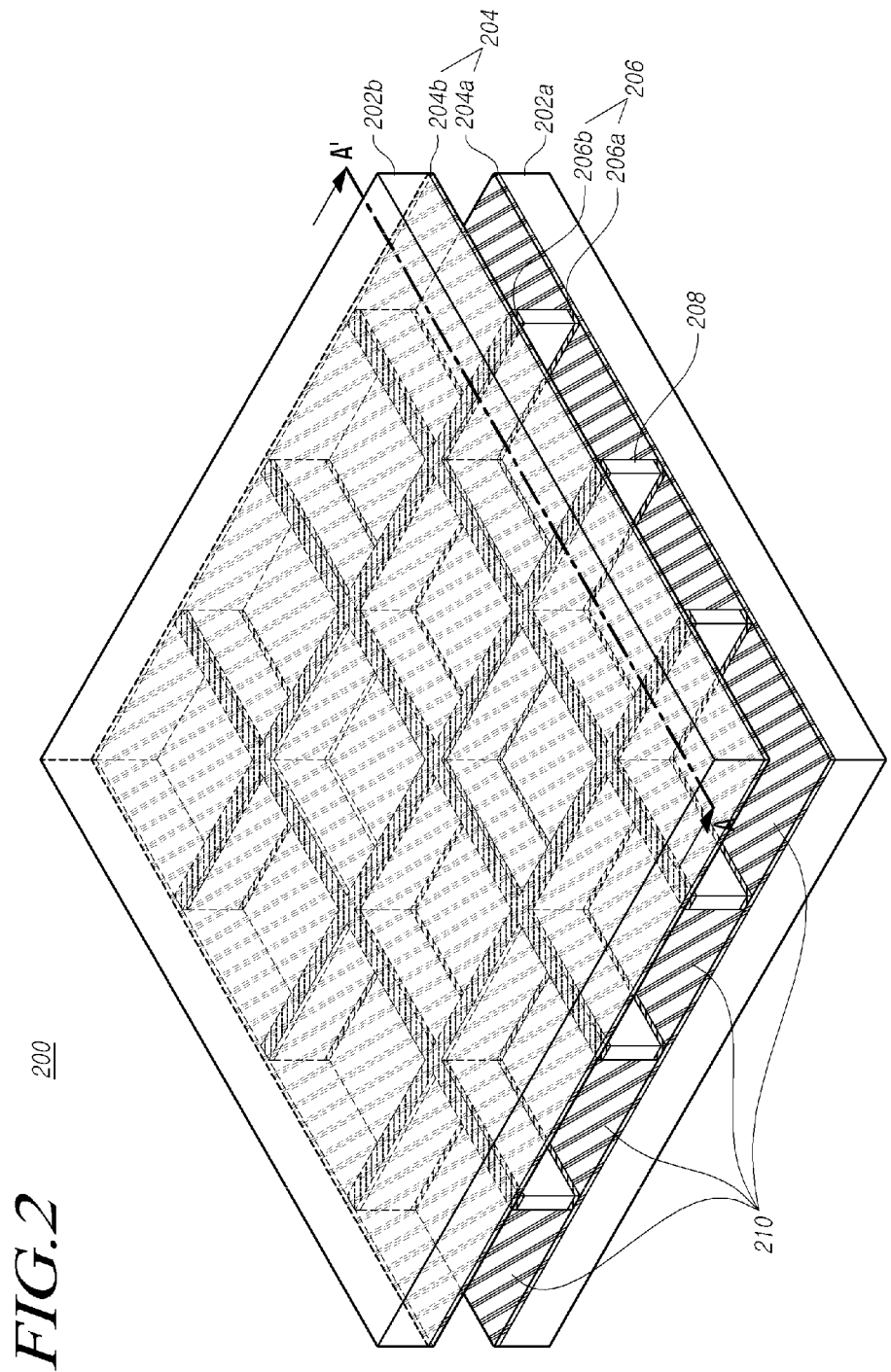
FIG. 2 is a schematic perspective diagram showing the liquid crystal display device of FIG. 1, according to an embodiment of the present disclosure.
Figure 3:
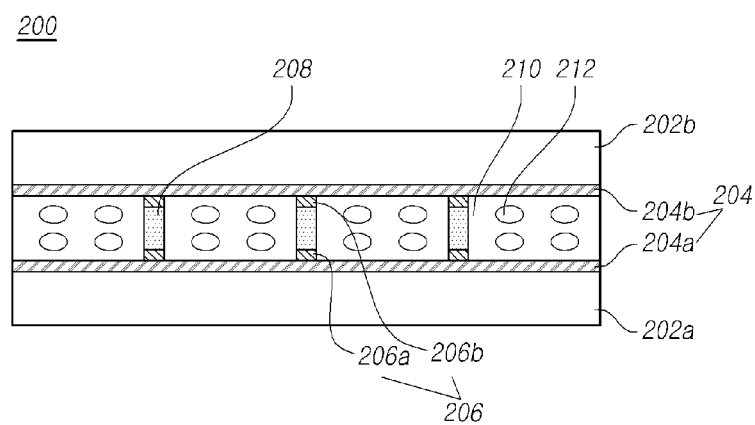
FIG. 3 is a sectional diagram of the liquid crystal display device illustrated in FIG. 2 having been cut in an AA' direction.

FIG. 2 is a schematic perspective diagram showing the liquid crystal display device of FIG. 1, according to an embodiment of the present disclosure, and FIG. 3 is a sectional diagram of the liquid crystal display device illustrated in FIG. 2 having been cut in an AA' direction.

Referring to FIG. 2 and FIG. 3, the liquid crystal display device 200 includes a first substrate 202a, a second substrate 202b, which is spaced apart from and opposite to the first substrate 202a, a first lower alignment layer 204a formed on an upper surface of the first substrate 202a, a first upper alignment layer 204b formed on a lower surface of the second substrate 202b (hereafter, the first lower alignment layer 204a and the first upper alignment layer 204B are collectively referred to as a first alignment layer 204), a second lower alignment layer 206a formed on an upper surface of the first lower alignment layer 204a, a second upper alignment layer 206b formed on a lower surface of the first upper alignment layer 204b (hereafter, the second lower alignment layer 206a and the second upper alignment layer 206b are collectively referred to as a second alignment layer 206 or alternatively, reflecting its adhesive properties, "adhesive layer 206"), a polymer barrier 208 formed between the first substrate 202a and the second substrate 202b, and a liquid crystal 212 positioned in a liquid crystal filling area 210.

First, the first substrate 202a and the second substrate 202b may be plastic-based compounds, such as polyethylene terephthalate (PET), polyethylene naphthalate (PEN), polycarbonate (PC), polyethersulphone (PES), polyarylate (PAR), polycyclic olefin (PCO), and polyimide (PI), but they are not limited thereto. The first substrate 202a and the second substrate 202b may be selected by taking into account of glass transition temperature, thermal expansion coefficient, and dimensional stability, and in particular, a PI-based compound may be suitable for the first substrate 202a and the second substrate 202b because it has high thermal stability.

The first substrate 202a and the second substrate 202b, which are plastic-based substrates, may be applied to a flexible display device which may be curved or bent, and the flexible display device requires a structure by which a cell gap may be maintained, which will be described below. The cell gap corresponds to a distance separating the first substrate 202a and the second substrate 202b.

The first alignment layer 204 may be composed of the polyimide-based compound. As an example, the first alignment layer 204 may include a compound formed by reacting at least one or more compounds (diamines) of 1,4-PDA

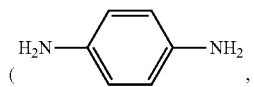

1,4-phenylene diamine), DAM

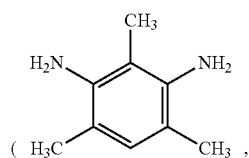

diamino mesitylene), m-TB-HG

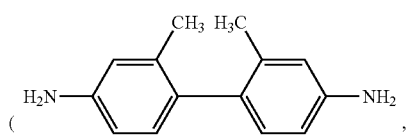

dimethyl diamino biphenyl), and TFMB

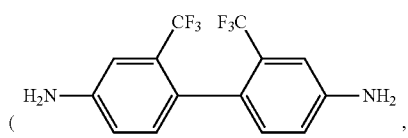 [SMILES: Nc1ccc(-c2ccc(N)cc2C(F)(F)F)c(C(F)(F)F)c1]

trifluromethyl diamino biphenyl) with at least one or more compounds (dianhydrides) of PMDA

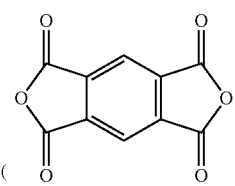

benzene tetracarboxylic dianhydride), BPDA

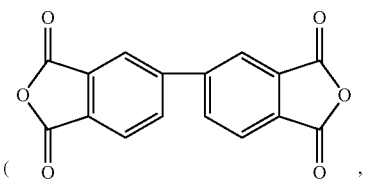 [SMILES: O=C1OC(=O)c2cc(-c3ccc4c(c3)C(=O)OC4=O)ccc21]

biphthalic anhydride), 6FDA

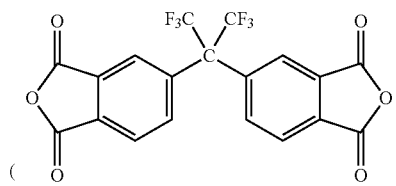

(hexafluoroisopropylidene)diphthalic anhydride), and NTDA

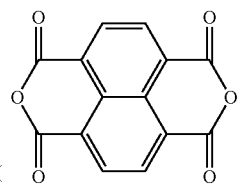

naphthalene tetracarboxylic dianhydride). The first lower alignment layer 204a and the first upper alignment layer 204b configuring the first alignment layer 204 may be the same compound, but they may be different compounds.

The first alignment layer 204 may include a compound having a hydrophobic functional group. The hydrophobic functional group is a functional group which may have a non-polar bond or a weak polar bond. Therefore, an adhesion of the first alignment layer 204 including a compound having a hydrophobic functional group, with the polymer barrier 208 is low. In some examples, the adhesion is 0.05 N/cm. For adhesions this low, the adhesion is negligible and does not affect the movement of liquid crystal molecules and monomer. As a result, an adsorption of a monomer forming the polymer barrier 208 through a thermal-curing process or a photo-curing process, may be prevented, thereby reducing an image retention of the liquid crystal display device 200.

A rubbing process may be performed on the surface of the first alignment layer 204 to align liquid crystals. Rubbing patterns of the first lower alignment layer 204a and the first upper alignment layer 204b may be the same, but they are not limited thereto, and may also vary depending on the liquid crystal mode.

A thickness of the first alignment layer 204 may be about 1 nm to 20 nm, but it is not limited thereto.

Next, the second alignment layer 206 may be composed of the polyimide-based compound. As an example, the second alignment layer 206 may include a compound formed by reacting at least one or more compounds (diamines) of ODA

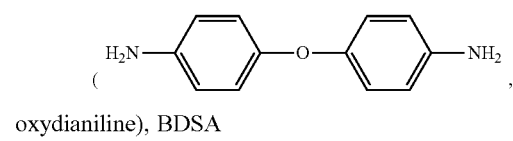

oxydianiline), BDSA

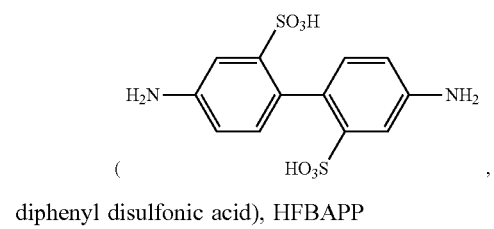

diphenyl disulfonic acid), HFBAPP

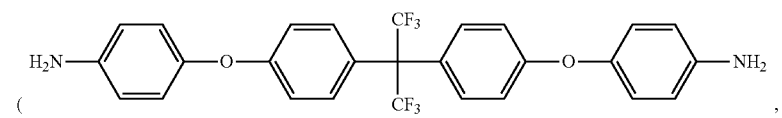

(aminophenoxy)phenyl hexafluoropropane), and AHHFP

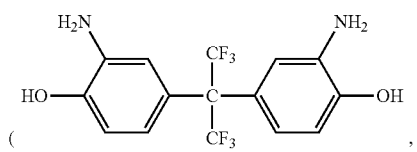

(aminohydroxyphenyl)hexafluoropropane) with at least one or more compounds (dianhydrides) of BTDA

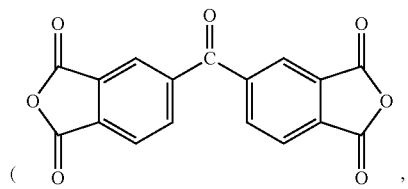 [SMILES: O=C(c1ccc2c(c1)C(=O)OC2=O)c1ccc2c(c1)C(=O)OC2=O]

benzophenone tetracarboxylic dianhydride), TMA

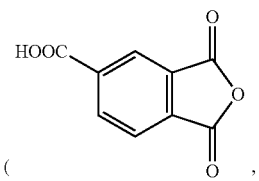 [SMILES: O=C(O)c1ccc2c(c1)C(=O)OC2=O]

trimellitic anhydride), and ODPA

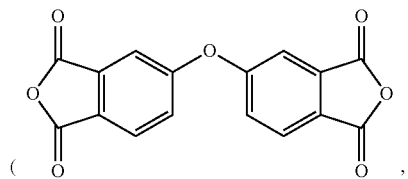 [SMILES: O=C1OC(=O)c2cc(Oc3ccc4c(c3)C(=O)OC4=O)ccc21]

oxydiphtalic anhydride). The second lower alignment layer 206a and the second upper alignment layer 206b may be the same compound, or different compounds.

The second alignment layer 206 may include a compound having a hydrophilic functional group. The hydrophilic functional group is the functional group which may form a hydrogen bond or has a polar bond. Because the compound having the hydrophilic functional group has higher surface energy than the compound having a hydrophobic functional group, an adhesion of the second alignment layer 206 including the compound having the hydrophilic functional group, with the polymer barrier 208 is high. In some examples, the adhesion is greater than 0.5 N/cm (which can be 10 times (or greater) than the adhesion of the first alignment layer). As a result, the cell gap of the liquid crystal display device 200 may be firmly maintained.

The second alignment layer 206 may be patterned so as to correspond to a part or all of the polymer barriers 208 forming an array. However, in FIG. 2 and FIG. 3, the liquid crystal display device 200 that all of the second alignment layer 206 and the polymer barrier 208 were corresponded was illustrated. That is, the liquid crystal display device 200 that the second alignment layer 206 was patterned so as to correspond to the polymer barrier 208 formed in one direction as well as the polymer barrier 208 formed in other direction perpendicular to the one direction was illustrated.

Further, the second alignment layer 206 may be formed on only one of the upper surface of the first lower alignment layer 204a or the lower surface of the first upper alignment layer 204b. However, in FIG. 2 and FIG. 3, as an example, the liquid crystal display device 200 that the second lower alignment layer 206a and the second upper alignment layer 206b were formed so as to correspond to all of an upper end and a lower end of the corresponding polymer barrier 208 was illustrated.

Meanwhile, if the first substrate 202a and the second substrate 202b of the liquid crystal display device 200 are composed of plastic materials, the polymer barrier 208 may be formed within a non-display region of the liquid crystal display device 200 to maintain the cell gap and prevent a problem that a seal is bursted due to the leaning of liquid crystals 212.

The polymer barrier 208 is formed by a polymerization reaction of the monomer injected with the liquid crystal 212 through phase separation by a photo-curing process or a thermal-curing process. In addition to the monomer, an initiator for initiating the polymerization reaction and a cross-linking agent for increasing the rigidity of the polymer barrier 208, with the liquid crystal 212 may be further included.

The array form of the polymer barrier 208 may be variously designed, and an array form of the second alignment layer 206 may vary accordingly. As an example, in FIG. 2, the liquid crystal display device 200 on which the polymer barriers 208, which were spaced side-by-side, were cross-formed three by three was illustrated.

Further, a thickness or an array shape of the polymer barrier may vary depending on the amount of monomer and the rate of phase separation.

The monomer may be an acrylate-based compound. As an example, the monomer may be at least one or more compounds of EHA (ethylhexyl acrylate), trimethylhexyl acrylate, ethoxylethyl acrylate, isobutyl acrylate, isooctyl acrylate, isodecyl acrylate, octadecyl acrylate, tert-buthyl acrylate, ethyl acrylate, methyl acrylate, buthyl acrylate, lauryl acrylate, lauryl methacrylate, pentafluoropropyl acrylate, hexafluoroisopropyl acrylate, trifluoroethyl acrylate, bisphenol A dimethyl acrylate, bisphenol A propoxylate diacrylate, trimethylpropane propoxylate triacrylate, trimethylhexyl acrylate.

The initiator for forming the polymer barrier 208 may be a photo-initiator, such as dibenzoyl peroxide, dicumyl peroxide, and tert-butyl peroxybenzoate, but it is not limited thereto.

The cross-linking agent may be PEGDA, HDDA, TPGDA, TMPTA, TMPTMP, and TMPTMA, but it is not limited thereto. While the polymer barrier 208 is formed, the cross-linking agent plays a role of bonding between functional groups within a polymer chain to more firmly create the polymer barrier 208.

Finally, the liquid crystal filling area 210 is formed between the first substrate 202a and the second substrate 202b, which are separated through the polymer barrier 208, and then the liquid crystal is filled in the liquid crystal filling area 210. As a result, light is transmitted depending on an alignment of the liquid crystal filled in the liquid crystal filling area 210, and in some cases, a monomer (a residual monomer), which is not used in the formation of the polymer barrier 208, may be included in the liquid crystal filling area 210.

Figure 4:
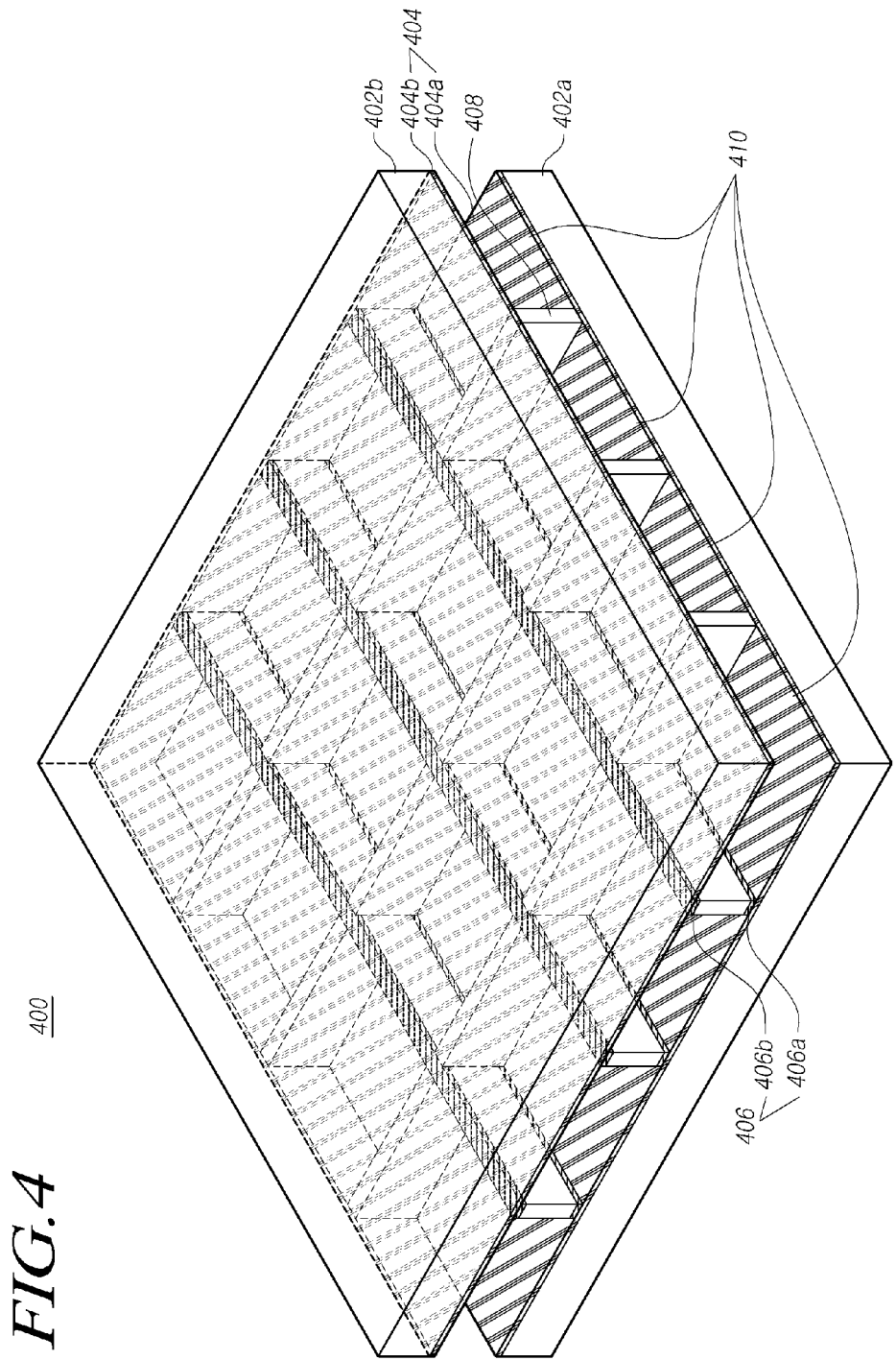
FIG. 4 is a schematic perspective diagram showing a liquid crystal display device according to another embodiment of the present disclosure.

FIG. 4 is a schematic perspective diagram showing a liquid crystal display device according to another embodiment of the present disclosure.

Hereafter, the same parts as FIG. 2 relating to the materials or properties of the components will be briefly described or omitted.

Referring to FIG. 4, the liquid crystal display device 400 includes a first substrate 402a, a second substrate 402b, which is spaced apart from and opposite to the first substrate, a first lower alignment layer 404a formed on an upper surface of the first substrate 402a, a first upper alignment layer 404b formed on a lower surface of the second substrate 402b (hereafter, the first lower alignment layer 404a and the first upper alignment layer 404b are collectively referred to as a first alignment layer 404), a second lower alignment layer 406a formed on an upper surface of the first lower alignment layer 404a, a second upper alignment layer 406b formed on a lower surface of the first upper alignment layer 404b (hereafter, the second lower alignment layer 406a and the second upper alignment layer 406b are collectively referred to as a second alignment layer 406), a polymer barrier 408 formed between the first substrate 402a and the second substrate 402b, and a liquid crystal filling area 410 provided by forming the polymer barrier 408.

The first substrate 402a and the second substrate 402b may be a plastic material, and particularly, may be PI-based materials having good thermal stability.

The first alignment layer 404 may be a polyimide-based compound formed by reacting at least one or more of diamine compounds with at least one or more of dianhydride compounds as described above.

Further, the first alignment layer 404 may include a compound having a hydrophobic functional group, and may be formed with a compound of which the adhesion with a polymer barrier is low.

Meanwhile, the second alignment layer 406 may be a polyimide-based compound formed by reacting at least one or more of diamine compounds with at least one or more of dianhydride compounds as described above.

Further, the second alignment layer 406 may include a compound having a hydrophilic functional group, and is formed with a compound of which the adhesion with the polymer barrier 408 is large, and for example, is formed so as to correspond to some of the polymer barrier 408. That is, in FIG. 4, the liquid crystal display device 400 on which the second alignment layer 406 was formed so as to correspond to only the polymer barriers 408 which are parallel in one direction was illustrated.

The three polymer barriers 408 of one direction are cross-formed with the three polymer barriers 408 of another direction perpendicular to the one direction, and the thicknesses of these polymer barriers 408 may be equally formed. Spaces between polymer barriers 408 in each direction, and a space between the first substrate 402a and the second substrate 402b are defined as the liquid crystal filling area 410, and liquid crystals are arranged in the liquid crystal filling area 410.

Next, a method for manufacturing the liquid crystal display device 200 will be described in FIG. 5 to FIG. 6F.

Figure 5:
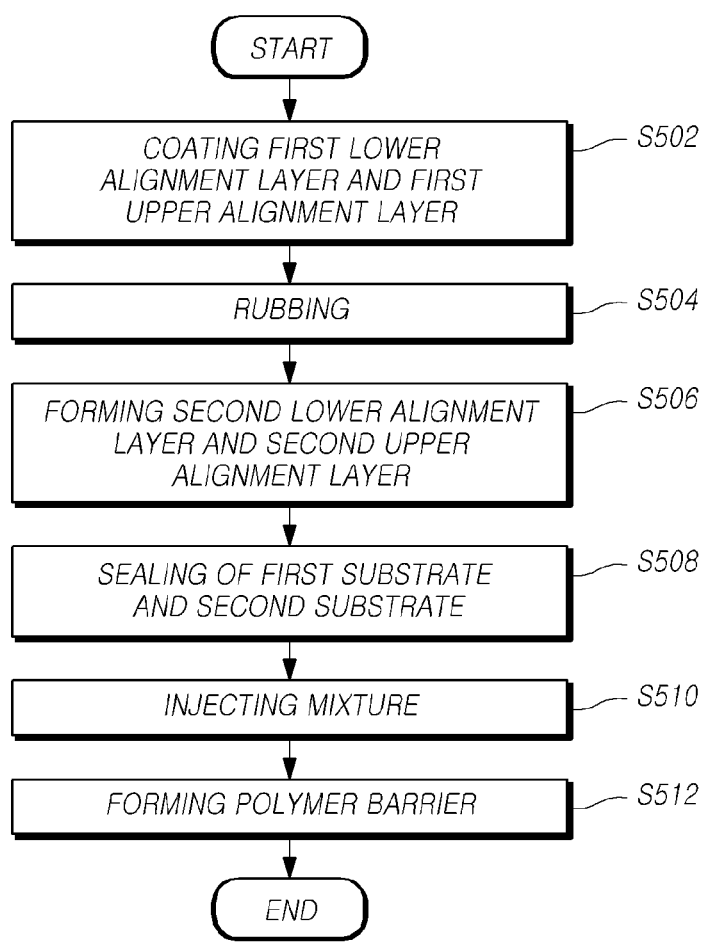
FIG. 5 is a schematic flowchart relating to a method for manufacturing a liquid crystal display device according to another embodiment of the present disclosure.

FIG. 5 is a schematic flowchart relating to a method for manufacturing a liquid crystal display device according to another embodiment of the present disclosure.

Referring to FIG. 5, the method for manufacturing a liquid crystal display device 500 includes a step of coating the first lower alignment layer 204a on the upper surface of the first substrate 202a; a step of coating the first upper alignment layer 204b on the lower surface of the second substrate 202b, which is spaced apart from and opposite to the first substrate 202a (S502); a step of rubbing the first lower alignment layer 204a and the first upper alignment layer 204b (S504); a step of forming the second lower alignment layer 206a on the upper surface of the first lower alignment layer 204a; a step of forming the second upper alignment layer 206b on the lower surface of the first upper alignment layer 204b (S506); a step of sealing the first substrate 202a and the second substrate 202b (S508); a step of injecting the mixture including the liquid crystal 212 and one or more of monomers between the first substrate 202a and the second substrate 202b (S510); and a step of forming the polymer barrier 208 between the second lower alignment layer 206a and the second upper alignment layer 206b.

First, the first substrate 202a and the second substrate 202b may be a plastic compound, such as PET, PEN, PC, PES, PAR, PCO, and PI, but they are not limited thereto.

The step of coating the first lower alignment layer 204a and the step of coating the first upper alignment layer 204b (S502) is a process of applying the first lower alignment layer 204a and the first upper alignment layer 204b on the whole surfaces of the upper surface of the first substrate 202a and the lower surface of the second substrate 202b, and may be performed by one process of a dry coating process, a wet coating process such as a spin coating process, and a printing process such as a screen printing or an inkjet printing, but they are not limited thereto.

Next, the step of rubbing the first lower alignment layer 204a and the first upper alignment layer 204b (S504) is a step of unidirectionally aligning side chains by rubbing the alignment layer of the thin film form by rotating a rubbing roll wrapped with a rubbing cloth, after applying the first lower alignment layer 204a and the first upper alignment layer 204b in a thin film form on the substrates, and curing. However, various processes, such as light irradiation process, in addition to the rubbing process may be applied.

The step of forming the second lower alignment layer 206a on an upper surface of the first lower alignment layer 204a and the step of forming the second upper alignment layer 206b on a lower surface of the first upper alignment layer 204b (S506) are performed by a soft lithography process, but they are not limited thereto.

The soft lithography process is a process of forming a pattern with an ink of a soft material, and a micro contact printing process, a nano imprinting lithography process, a dip pen lithograpy process, a micro molding process, and a micro transfer printing process are included in the soft lithography process. The micro contact printing was described as an example in embodiments of the present disclosure, but it is not limited thereto. Detailed process will be described in detail with reference to FIG. 6C.

The second lower alignment layer 206a and the second upper alignment layer 206b may be patterned so as to correspond to a part or all of the polymer barrier 208, which will be formed later, and the cell gap of the liquid crystal display device 200 may be more firmly maintained when the second lower alignment layer 206a and the second upper alignment layer 206b correspond to more parts of polymer barrier 208.

Then, the step of sealing the first substrate 202a and the second substrate 202b is performed, and then the step of injecting a mixture including one or more monomers, an initiator, and a cross-linking agent with a liquid crystal 212 in a space between the sealed substrates is performed.

The monomer may be an acrylate-based compound, but it is not limited thereto. The monomer forms the polymer barrier 208 through a radical polymerization during a photo-curing process or a thermal-curing process.

The initiator may be a photo-initiator, such as dibenzoyl peroxide, dicumyl peroxide, and tert-butyl peroxybenzoate, but it is not limited thereto, and may be an initiator which responds to heat. The initiator plays a role as an initiator for a polymerization reaction.

The mixture may include a cross-linking agent, such as PEGDA, HDDA, TPGDA, TMPTA, TMPTMP, and TMPTMA, but it is not limited thereto. While the polymer barrier 208 is formed, the cross-linking agent plays a role of bonding between functional groups within a polymer chain to more firmly create the polymer barrier 208.

This mixture may be a mixture in which two or more acrylate monomers, a initiator, and a cross-linking agent are mixed in a certain ratio, and the ratio of the monomers may be determined so as to correspond to a polymer barrier.

Finally, the step of forming the polymer barrier 208 between the second lower alignment layer 206a and the second upper alignment layer 206b is performed. The polymer barrier 208, for example, may be formed by a phase separation phenomena according to UV irradiation, but it is not limited thereto. Further, the polymer barrier 208 may be formed by thermal-curing using heat, or by irradiating a light, which belongs to a different area, in addition to UV light.

As described above, the method for manufacturing the liquid crystal display device 200 was fully described. Hereafter, as another embodiment of the present disclosure, the specific method for manufacturing the liquid crystal display device 200 illustrated in FIG. 2 and FIG. 3 will be described in detail.

FIG. 6A to FIG. 6F are diagrams showing a method for manufacturing a liquid crystal display device according to another embodiment of the present disclosure.

Figure 6A:
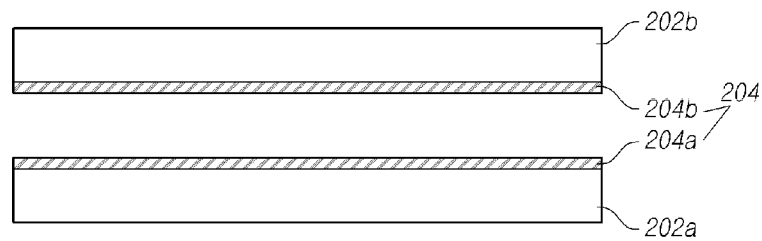
FIG. 6A to FIG. 6F are diagrams showing a method for manufacturing a liquid crystal display device according to another embodiment of the present disclosure.

Referring to FIG. 6A, first, the step of coating the first lower alignment layer 204a and the first upper alignment layer 204b, respectively, on the upper surface of the first substrate 202a and the lower surface of the second substrate 202b is performed.

The first substrate 202a and the second substrate 202b may be a plastic material for a flexible display device.

The first substrate 202a and the second substrate 202b are washed, and then a thermal treatment process for ensuring a tolerance in a process to which heat is applied may be included because a plastic-based material has a relatively low thermal expansion coefficient.

The coating process is a process by which the first lower alignment layer 204a and the first upper alignment layer 204b are applied on whole surfaces of both the upper surface of the first substrate 202a and the lower surface of the second substrate 202b, and may be performed by a spin coating process, which is one of wet coating processes.

Figure 6B:
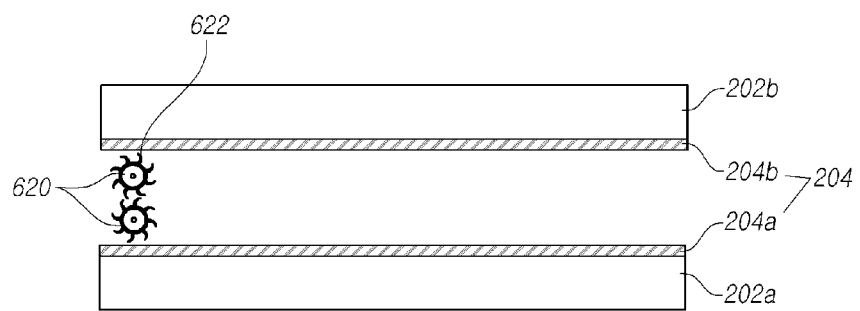

Referring to FIG. 6B, the rubbing process is performed on the first lower alignment layer 204a and the first upper alignment layer 204b.

The rubbing process is a process of unidirectionally aligning molecules by rubbing the first lower alignment layer 204a and the first upper alignment layer 204b by rotating a rubbing roll 620 wrapped with a rubbing cloth 622. Thereafter, liquid crystals 212 are aligned in the direction in which molecules are aligned by the rubbing roll 620.

Figure 6C:
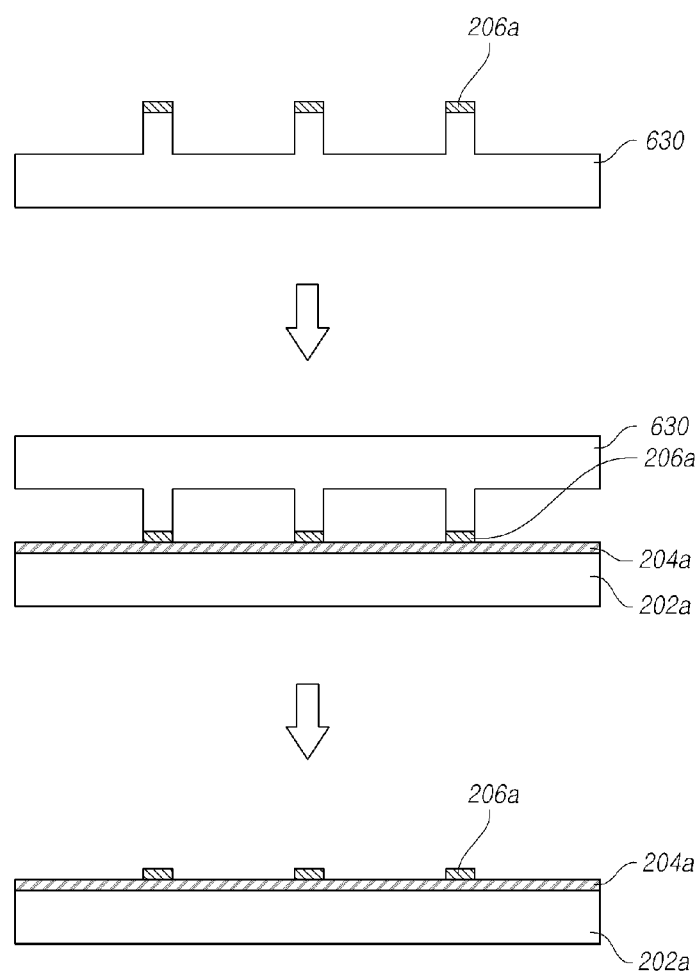

Referring to FIG. 6C, a process, which the second lower alignment layer 206a is formed by a micro contact printing method, is illustrated.

The micro contact printing method is a simple process which may applied when a pattern is transferred, and goes through a process, which creates a template of a pattern formation on a stamp substrate 630, applies an ink of the second lower alignment layer 206a material on the created template, and then prints the pattern on the first lower alignment layer 204a. Further, the second upper alignment layer 206b may be formed in the same method even though it was not illustrated in FIG. 6C.

The second lower alignment layer 206a and the second upper alignment layer 206b may be patterned so as to correspond to all of the polymer barrier 208, which will be formed later, and thus the cell gap of the liquid crystal display device 200 may be firmly maintained.

Meanwhile, the second lower alignment layer 206a may include a compound having a hydrophilic functional group, and because a compound having a hydrophilic functional group has higher surface energy than a compound having a hydrophobic functional group, an adhesion per unit area of the second alignment layer 206a including a compound having a hydrophilic functional group, with the polymer barrier 208 is relatively large.

Figure 6D:
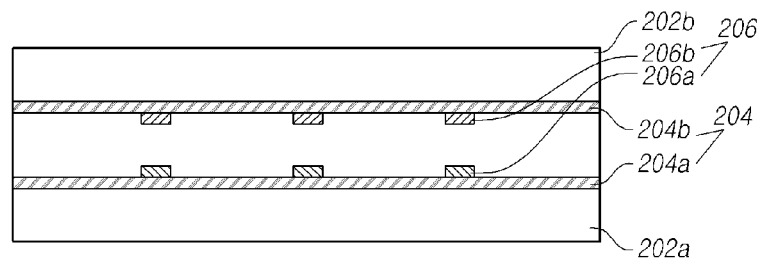

Referring to FIG. 6D, the first substrate 202a and the second substrate 202b are sealed.

Figure 6E:
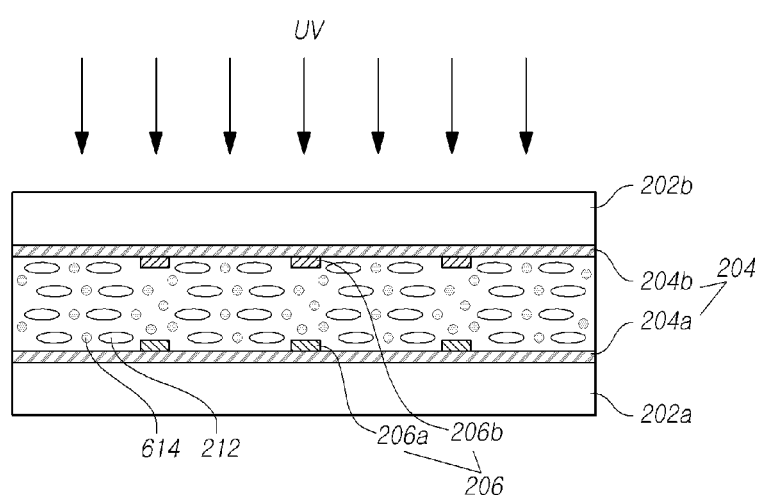

Subsequently, referring to FIG. 6E, as an example, the step of injecting a mixture including one or more monomers 614, a photo-initiator, and a cross-linking agent with a liquid crystal 212 in a space between the first substrate 202a and the second substrate 202b, which were sealed, is performed.

The monomer 614 may be an acrylate-based compound, and the phase separation characteristic and the thickness of the polymer barrier 208 may be controlled by adjusting the content of the monomer 614.

After injecting a mixture in the space, ultraviolet (UV) light is irradiated on it so that a radical polymerization reaction is initiated by a photo-initiator.

Figure 6F:
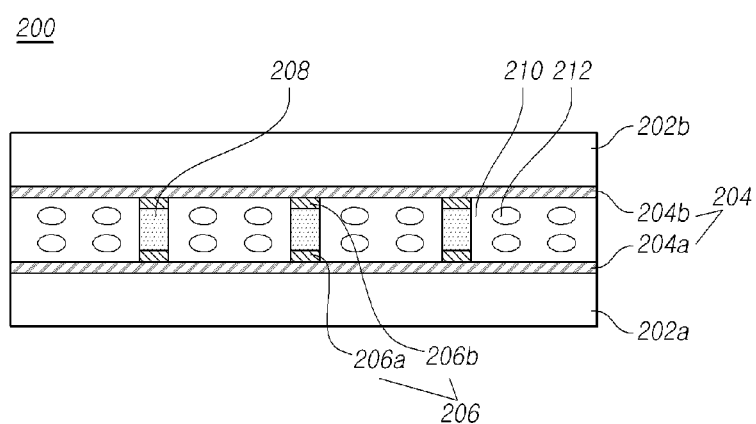

Referring to FIG. 6F, the polymer barrier 208 is formed, thereby completing the liquid crystal display device 200. Therefore, the liquid crystal filling area 200 is created between the polymer barriers 208, and the liquid crystal 212 and the monomer 614, which is not used to the formation of the polymer barrier 208, are positioned in the liquid crystal filling area 200.

The polymer barrier 208 is formed so as to correspond to the second alignment layer 206, and the forming process of it is as follows. A mask on which a pattern is formed is positioned on a top or bottom of the liquid crystal display device 200, and UV light is irradiated from the top or bottom of the liquid crystal display device 200. As a result, the phase separation occurs by the polymerization reaction of monomers 614 performed in a region on which UV light is irradiated, thereby forming the polymer barrier 208 in the region, and the liquid crystals are separated and positioned in a region on which UV light is not irradiated, that is, a display region.

As described above, the liquid crystal display device 200 and the method for manufacturing the same were described with reference to the accompanying drawings. In summary, the liquid crystal display device 200 according to embodiments of the present disclosure includes the alignment layers (204, 206) which are formed by a double, and the first alignment layers (204a, 204b) are formed with a compound having a hydrophobic functional group which has a relatively low adhesion with the polymer barrier 208 to prevent a phenomenon by which a monomer, which remains after forming the polymer barrier 208, is adsorbed on the first alignment layers (204a and 204b), thereby occurring image retention. Further, the second alignment layer 206 is formed with a compound having a hydrophilic functional group which has a relatively high adhesion with the polymer barrier 208 to have an effect by which a cell gap is relatively firmly maintained.

As described above, embodiments of the present disclosure have been described with reference to the accompanying drawings, but the disclosure is not limited thereto.

Further, the terms "includes", "constitutes", or "has" mentioned above mean that a corresponding structural element is included unless they have no reverse meaning. Accordingly, it should be interpreted that the terms may not exclude but further include other structural elements. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

What is claimed is:

1. A method for manufacturing a liquid crystal display device, the method comprising:
    forming a first lower alignment layer on an upper surface of a first substrate;
    forming a first upper alignment layer on a lower surface of a second substrate spaced apart from and opposite to the first substrate;
    forming a second alignment layer including a second lower alignment layer and a second upper alignment layer on either or both of an upper surface of the first lower alignment layer or a lower surface of the first upper alignment layer, the second lower alignment layer formed in an array;
    sealing the first substrate and the second substrate;
    injecting a mixture including a liquid crystal and one or more of monomers between the first substrate and the second substrate; and
    forming a polymer barrier between the second lower alignment layer and the second upper alignment layer from the injected one or more monomers, the polymer barrier formed on the array of the second alignment layer.

2. The method of claim of 1, wherein the forming of the first lower alignment layer and the forming of the first upper alignment layer comprise one of a dry coating process, a wet coating process, and a printing process.

3. The method of claim of 1, wherein the forming of the second lower alignment layer and the forming of the second upper alignment layer comprise a soft lithography process.

4. The method of claim of 1, wherein the forming of the second lower alignment layer and the forming of the second upper alignment layer comprise a printing process.

5. The method of claim 1, wherein the forming of the polymer barrier comprises polymerizing monomers using at least one of heat and light.

6. The method of claim of 1, wherein the polymer barrier is formed so as to correspond to the second lower alignment layer and the second upper alignment layer.

7. A method for manufacturing a liquid crystal display device, the method comprising:
    forming a first upper alignment layer on an upper surface of a first substrate;
    forming a first lower alignment layer on an lower surface of a second substrate spaced apart from and opposite to the first substrate;
    forming one or more adhesive layers on at least one of the first upper alignment layer and the first lower alignment layer, the one or more adhesive layers formed in an array;
    injecting a mixture including a liquid crystal and one or more of monomers between the first substrate and the second substrate;
    forming a polymer barrier in the array between the one or more adhesive layers and at least one of the first lower alignment layer and the first upper alignment layer, and
    wherein at least one of the adhesive layers comprises a hydrophilic functional group.

8. The method of claim 7, wherein the one or more adhesive layers are on both of the first upper alignment layer and the first lower alignment layer.

9. The method of claim 8, wherein the polymer barrier is between a first adhesive layer on the first upper alignment layer and a second adhesive layer on the first lower alignment layer.

10. The method of claim 7, wherein at least one of the adhesive layers comprises a hydrophobic functional group.

* * * * *